April 26, 1966 R. W. HOWARD ETAL 3,248,729
MONITORING SYSTEM FOR DISTANCE MEASURING EQUIPMENT
Filed Jan. 15, 1964
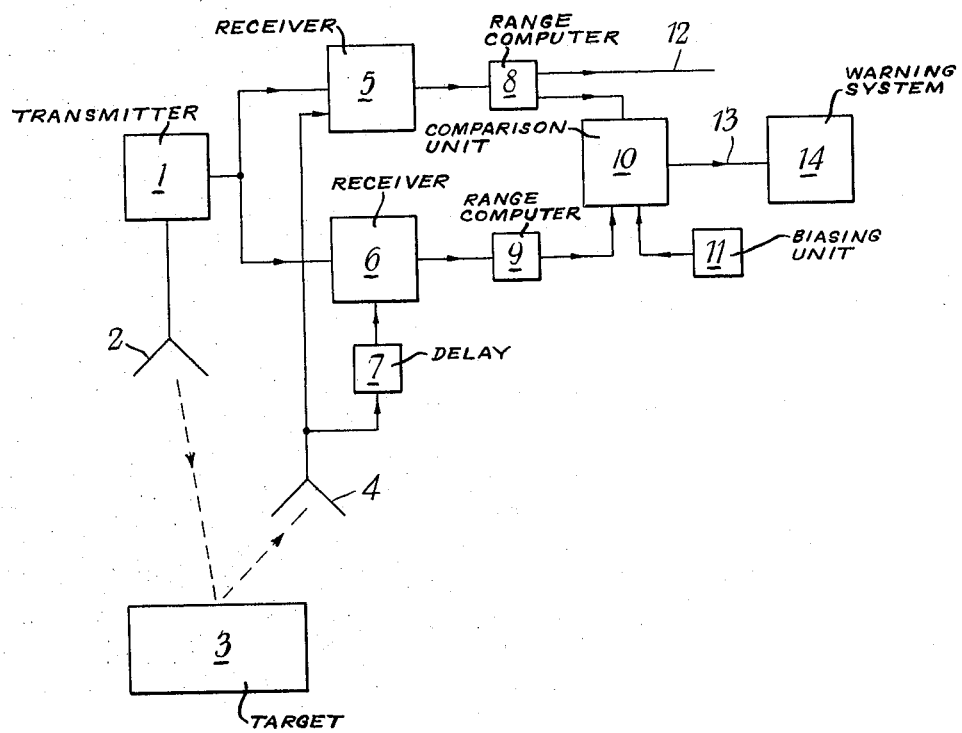
INVENTORS:
RONALD WALTER HOWARD
FRANK HENRY BEVAN
Bailey, Stephens & Huettig
ATTORNEYS

United States Patent Office 3,248,729
Patented Apr. 26, 1966

3,248,729
MONITORING SYSTEM FOR DISTANCE
MEASURING EQUIPMENT
Ronald Walter Howard, Radlett, and Frank Henry
Bevan, London Colney, England, assignors to Elliott
Brothers (London) Limited, London, England, a company of Great Britain
Filed Jan. 15, 1964, Ser. No. 337,780
Claims priority, application Great Britain, Jan. 16, 1963,
1,986/63
7 Claims. (Cl. 343—12)

This invention relates to improvements in distance measuring equipment and is particularly concerned with such equipment of the kind (hereinafter referred to as being of "the kind specified") comprising a transmitter for radiating acoustic or electromagnetic energy in the form of pulses or a frequency modulated continuous wave, a receiver for detecting the energy reflected from a surface irradiated by the transmitted energy and means for comparing the transmitted and received energy to derive a signal having a parameter representing the time interval which elapses between the transmission of the energy and the receipt of the reflected energy, this time interval being a function of the distance of the reflecting surface from the transmitter. In the case of pulsed energy, this time interval is derived by comparing the time of transmission of a pulse of energy with the time of receipt of the corresponding reflected energy pulse. In the case of frequency modulated continuous wave energy, the frequency of modulation of the transmitted energy is continuously varied at a known rate through a selected range and the frequency of modulation of the received energy is compared with that of the energy being transmitted to derive a measure of the difference between the frequency of modulation of the transmitted and received energy, which frequency difference is a function of the time interval referred to and hence of the distance of the reflecting surface from the transmitter.

It is an object of the present invention to provide a distance measuring equipment of the kind specified with means for monitoring the equipment whereby the development of a fault shall be readily apparent.

The present invention broadly stated provides a distance measuring equipment of the kind specified in combination with a second receiver for detecting the reflected energy, second means for comparing the transmitted energy and the energy received by the second receiver to derive a second signal having a parameter representing the time interval between the transmission of energy and receipt of the reflected energy and means for comparing said parameter of the first-mentioned and the second signals to detect any inequality therebetween.

Preferably, delay means is associated with said second receiver to introduce a difference between said parameters of known magnitude.

Advantageously, means is provided for biasing said comparison means in the sense to compensate for said known difference between said parameters.

One embodiment of the invention will now be described by way of example, reference being made to the accompanying block schematic diagram.

In the distance measuring equipment of this example, a transmitter 1 is provided to radiate pulses of electromagnetic energy into space from an aerial 2 towards a target 3 from which the energy is reflected to a receiving aerial 4 common to two receivers 5 and 6 which also receive the pulses of energy directly from the transmitter 1 usually through an attenuator (not shown). The energy from the receiving aerial 4 is supplied to the receiver 6 through a delay unit 7 affording a pulse delay of known magnitude. A range computer 8 is associated with the receiver 5 and operates to compare the time of transmission of each radiated pulse with the time of receipt of the corresponding reflected pulse to provide an output signal having a parameter representing the time interval between the transmission of a pulse and receipt of the corresponding reflected pulse by the receiver 5 and hence representing the distance of the target 3 from the transmitting aerial 2. A range computer 9 similar to the range computer 8 is associated with the receiver 6 to provide an output signal having a parameter representing the time interval between the transmission of a pulse and receipt of the corresponding reflected pulse by the receiver 6 and hence representing the distance of the target 3 from the transmitting aerial 2 plus a distance of known magnitude corresponding to delay afforded by the unit 7. The output signal from the computer 8 is supplied along line 12 to other equipment (not shown) in the normal way, e.g., for processing and/or display purposes and is also supplied together with the output signal from the computer 9 to a comparison unit 10 in which the parameters are compared. The comparison unit 10 also has a fixed bias supplied thereto from a biasing unit 11 in parallel with the signal from the computer 9 to compensate for the difference in the magnitude of the parameters introduced by the delay unit 7.

In the operation of the apparatus, an output signal is derived from the computer 8 representing the distance being measured and no output is derived from the comparison unit 10 as long as the equipment functions correctly. As soon as a fault is developed, this appears as an output signal from the comparison unit 10 along line 13 and this output signal can be utilized to operate an alarm or warning system 14.

It will be appreciated that continuous wave energy frequency modulated at a known rate over a swept range of frequencies may be radiated instead of pulsed energy, in which case, the delay unit 7 would be a continuous wave delay device. In this case also, the computer 8 would operate to derive a measure of the difference in the modulation frequencies of the received and transmitted energies at any instant of time so that the output signal therefrom would have a parameter representing this difference and hence the distance of the target 3 from the transmitting aerial 2. The computer 9 would function similarly, its output representing the distance referred to plus a distance corresponding to the delay afforded by the unit 7.

It will also be appreciated that the radiated energy need not be electromagnetic but may be acoustic as is used in under-water measuring equipment.

It will be further appreciated that, in the absence of the delay unit 7 and the biasing unit 11, the apparatus would not detect the absence of a received signal, e.g., due to transmitter failure, without the introduction of additional signal strength monitoring equipment.

We claim:

1. In a distance measuring equipment of the kind comprising a transmitter for radiating energy, a first receiver for detecting energy reflected from a surface irradiated by the radiated energy and first means for comparing the transmitted and received energy to derive a first signal having a parameter representing the time interval between the transmission of energy and receipt of the reflected energy; the improvement which comprises a second receiver for detecting the reflected energy, delay means associated with said second receiver to delay by a predetermined period of time the detection of the reflected energy by said second receiver, second means for comparing the transmitted energy with the energy detected by the second receiver to derive a second signal having a parameter representing the time interval between transmission of energy and detection of the reflected energy by said second receiver and means for comparing said parameter of said first and second signals to detect any departure of the difference between said parameters from a value corresponding to said predetermined period of time.

2. In a distance measuring equipment of the kind comprising a transmitter for radiating energy, a first receiver for detecting energy reflected from a surface irradiated by the radiated energy and first means for comparing the transmitted and received energy to derive a first signal having a parameter representing the time interval between the transmission of energy and receipt of the reflected energy; the improvement which comprises a second receiver for detecting the reflected energy, delay means associated with said second receiver to delay by a predetermined period of time the detection of the reflected energy by said second receiver, second means for comparing the transmitted energy with the energy detected by the second receiver to derive a second signal having a parameter representing the time interval between transmission of energy and detection of the reflected energy by said second receiver, comparator means for comparing said parameter of said first and second signals and biassing means arranged to bias said comparator means in the sense to compensate for the delay introduced by said delay means whereby said comparator means is operative to produce an output representing inequality between said time intervals represented by said first and second signals.

3. Distance measuring equipment comprising a transmitter for radiating energy, a receiver for receiving energy reflected from a surface irradiated by the radiated energy, first means responsive to the radiation of energy and the receipt by said receiver of the received energy to derive a first signal representing the time interval between transmission and receipt of said energy, delay means operable to delay the received energy by a predetermined period of time, second means responsive to the radiation of energy and the delayed energy to derive a second signal representing the sum of said time interval and said predetermined period of time, comparator means supplied with said first and second signals and biassing means operable to bias said comparator means in the sense to compensate for said delay introduced by said delay means whereby said comparator means is operable to detect any departure of the difference between said first and second signals from a value corresponding to said predetermined period of time.

4. Distance measuring equipment comprising a transmitter for radiating pulses of energy, a first receiver for detecting pulses of energy reflected from a surface irradiated by the radiated energy, first means responsive to the time of transmission of a pulse of energy and the time of detection of the corresponding reflected pulse by said first receiver to derive a first signal representing the time interval between said time of transmission and said time of detection, a second receiver for detecting pulses of energy reflected from said surface, delay means operable to delay the reflected pulses detected by said second receiver, by a predetermined period of time, second means responsive to the time of transmission of a pulse of energy and the delayed time of detection of the corresponding reflected pulse to derive a second signal representing the time interval between said time of transmission and said delayed time of detection and comparison means applied with said first and second signals and operable to detect any departure of the difference between said first and second signals from a value representing said predetermined period of time.

5. Distance measuring equipment according to claim 4 including biassing means operable to bias said comparison means in the sense to compensate for any difference between said first and second signals of a value representing said predetermined period of time.

6. Distance measuring equipment comprising a transmitter for radiating energy in the form of continuous waves frequency modulated at a frequency which continuously varies over a swept range of modulating frequencies, a first receiver for detecting energy reflected from a surface irradiated by the radiated energy, first means responsive to the difference between the frequency of modulation of the received energy and the frequency of modulation of the energy transmitted at the time of receipt of the received energy to derive a first signal representing the time interval between the time of transmission of the received energy by the transmitter and the time of detection thereof by the first receiver, a second receiver for detecting energy reflected from said surface, continuous wave delay means operable to delay the reflected energy detected by said second receiver by a predetermined period of time, second means responsive to the difference between the frequency of modulation of the delayed received energy and the frequency of modulation of the energy transmitted at the time of detection of the delayed received energy by said second receiver to derive a second signal representing the time interval between the time of transmission of the received energy and the time of detection thereof by said second receiver, and comparison means supplied with said first and second signals and operable to detect any departure of the difference between said first and second signals from a value representing said predetermined period of time.

7. Distance measuring equipment according to claim 6 including biassing means operable to bias said comparison means in the sense to compensate for any difference between said first and second signals of a value representing said predetermined period of time.

References Cited by the Examiner
UNITED STATES PATENTS
2,405,238  8/1946  Seeley _____ 343—103

CHESTER L. JUSTUS, *Primary Examiner.*

R. E. KLEIN, P. M. HINDERSTEIN,
*Assistant Examiners.*